United States Patent [19]

Ching-An

[11] Patent Number: 4,625,124
[45] Date of Patent: Nov. 25, 1986

[54] SEA WAVE IMPACTED POWER GENERATING DEVICE

[76] Inventor: Wu Ching-An, P.O. Box 10160, Taipei, Taiwan

[21] Appl. No.: 671,163

[22] Filed: Nov. 13, 1984

[51] Int. Cl.$^4$ .............................................. F03B 13/12
[52] U.S. Cl. ....................................... 290/42; 290/53; 415/7; 417/330
[58] Field of Search ...................... 290/42, 53; 415/7; 416/85, 179; 417/330, 331

[56] References Cited

U.S. PATENT DOCUMENTS

| | | | |
|---|---|---|---|
| 641,233 | 1/1900 | Roell | 417/330 |
| 3,644,052 | 2/1972 | Lininger | 415/7 |
| 4,172,689 | 10/1979 | Thorsheim | 290/42 X |
| 4,263,516 | 4/1981 | Papadakis | 290/53 |

*Primary Examiner*—Bernard Roskoski
*Assistant Examiner*—W. E. Duncanson, Jr.

[57] ABSTRACT

A sea wave impacted power generating device, comprising essentially a fix support, a movable bearer, a blade type water wheel, two pressure cylinders, a storage cylinder, two braking means and several floating bodies. Bottom of said movable bearer has several floating bodies mounted thereon and floated on then face. Square horn port and water channel thereof are used to introduce impact impulsion force of sea wave to push a blade type water wheel and further to rotate an eccentrically mounted connecting rod. Connecting rod is used to cause displacement of piston of the pressure cylinder to generate high pressure air to be stored in a pressure cylinder and used for power or electricity generating device activated by high pressure air.

3 Claims, 6 Drawing Figures

SEA WAVE IMPACTED POWER GENERATING DEVICE

BACKGROUND OF THE INVENTION

After several times of oil shocks, people nowadays are extremely concerned over supply of the petroleum energy, fuel cost and pollution of living environment caused from oil. Therefore, dependence of oil supply is gradually switched to other natural clean energies such as solar energy, wind energy and hydraulic energy in order to substitute the gradually exhausted energy, i.e. petroleum, and increase the quality of living environment. However, due to limitation of latitude and structure of the globe, solar energy and wind energy are not always available for use, while hydraulic energy which is a mechanical kinetic energy of rotation converted from kinetic energy of flowing water has been widely utilized. Availability of hydraulic energy is largely affected by amount and velocity of water in a river, therefore, the hydraulic energy generating device will be useless in the dry season, while it will be easily damaged in water season when water velocity is very high.

Accordingly, the present inventor through tremeudous efforts has now disclosed novel power generating device by utilizing wave impact of sea water wherein energy source of the mechanical device comes from power generated by impulsion force of impacted wave in the sea.

BRIEF DESCRIPTION OF THE INVENTION

The object of the present invention is to provide a sea wave impacted power generating device, comprising essentially a fix support, a movable bearer, a blade type water wheel, two pressure cylinders, a storage cylinder, two braking means and several floating bodies. Said blade type water wheel can be rotated by impulsion force of impacted sea wave thus activates the eccentric wheel to effect the pressure cylinder to compress the air, and further generates high pressure gas to be stored in storage cylinder for acting as energy source of power or electric generating device.

The other object of the present invention is to provide a sea wave impacted power generating device wherein a blade type water wheel will not be affected by level of tide and magnitude of sea wave. It will be commensurable to variation of the sea surface, thus achieves the full utilization of impulsion force of impacted sea wave.

DETAILED DESCRIPTION OF THE INVENTION

Figure 1:
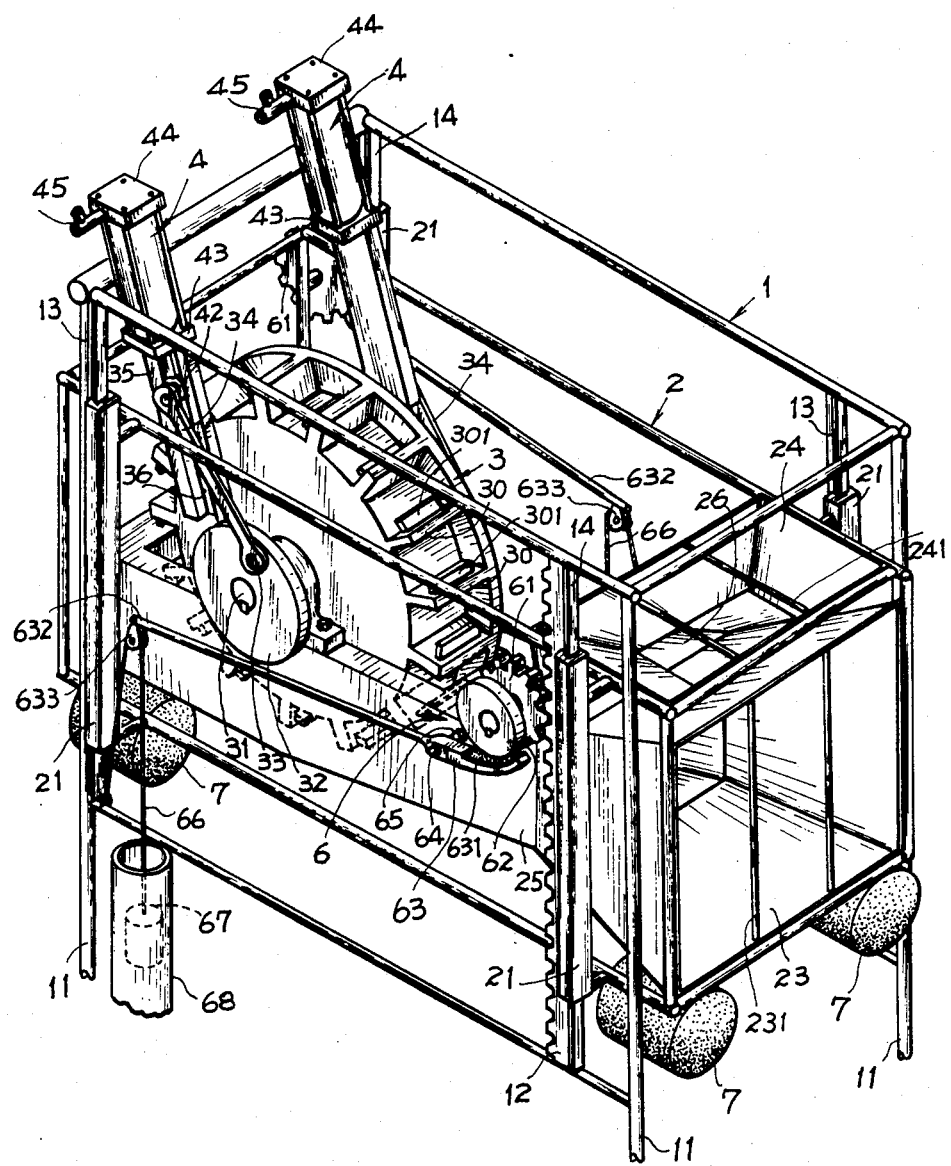
FIG. 1 is a perspective view showing the structure of the present invention.
Figure 2:
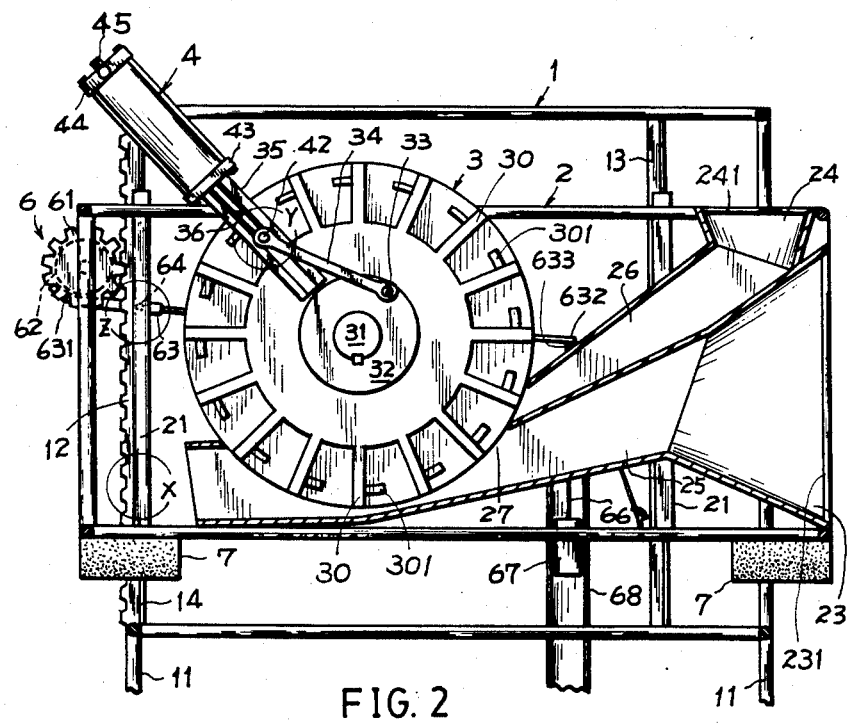
FIG. 2 is a side elevational view of the present invention.
Figure 3:
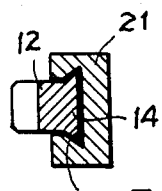
FIG. 3 is a detail view showing the "X" portion of FIG. 2.
Figure 4:
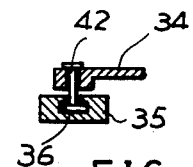
FIG. 4 is a detail view showing the "Y" portion of FIG. 2.
Figure 5:
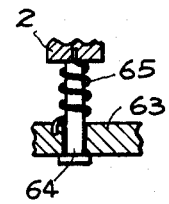
FIG. 5 is a detail view showing the "Z" portion of FIG. 2.
Figure 6:
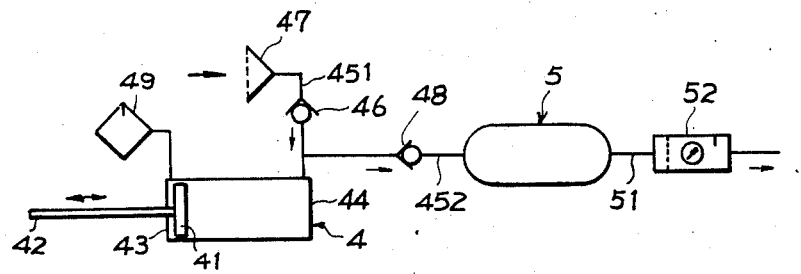
FIG. 6 is an operational system diagram of the present invention.

Referring to the Figures, the power generating device of the present invention comprising essentially a fix support (1), a removable bearer (2), a blade type water wheel (3), two pressure cylinders (4), a storage cylinder (5), two braking means (6), and several floating bodies (7). Strut (11) of said fix support (1) is fixed to shallow sea bed at its bottom portion while both sides of its upper portion are each vertically provided a tooth strip (12) and a dovetail strip (13), rear sides of said tooth strips (12) are each further connected to a dovetail strip (14).

A movable bearer (2) is slidely mounted inside said fix support (1), both sides thereof are each provided two guide rods (21), a dovetail channel (22) is provided on the guide rod (21) which is corresponding and slidely matching to dovetail strip (13) on the fix support (1) and dovetail strip (14) on the tooth strip (12), thus enables to maintain sliding of movable bearer (2) in a vertical direction. Said movable bearer (2) has square horn port (23) (24) each provided at front end face and upper end face thereof, said horn ports (23) (24) are connected to several rods (231) (241) to prevent entry of large impurities, and further connected to water channel (25) (26). Said water channels (25) (26) are parallelly disposed at different height and gradually contracted toward its outlet where a water wheel (3) of blade type is provided on a connecting line (27). Water wheel of blade type (3) has a nose strip (301) provided on single direction of each blade (30), both ends of the wheel shaft (31) each pivotally connected to movable bearer (2) by means of a bearing and seat (32), and further extends at both ends of the wheel shaft (31) where each provided a round disk (32). External side face of said disk (32) is pivotally connected to end of a connecting rod (34) by a pin (33), while other end of the connecting rod (34) is pivotally connected to rod end (42) of piston (41) of pressure cylinder (4) provided on movable bearer (2). A quite rod (35) has a channel (36) provided thereon, it is fixed to seat (43) of the pressure cylinder (4) and permits rod end (42) of piston of the pressure cylinder (4) slidable within channel (36) of said guide rod (34), thus enables to maintain a linear movement of said rod end (42) of the piston.

Top cover (44) of the pressure cylinder (4) is connected to a Tee manifold (45), a manifold (451) having a check valve (46) provided thereon and connected to an air filter (47), other manifold (452) also having a check valve (48) provided thereon and connected to a pressure cylinder (5). A lubricator (49) is connected to seat (43) of the pressure cylinder, and also having a pipe (51) connected to a three-point combination (52) comprising a filter, a pressure regulator and a lubricator, thus facilitates generation of power or electricity by means of high pressure air. Both sides of said movable bearer (2) each has a braking means (6) extended therefrom, gear (61) of said braking means (6) being corresponded and matched to a tooth strip (12) mounted on fix support (1), also, a braking disk (62) being extended from the gear (61), a braking rod (63) being provided beneath the braking disk (62); said braking rod (63) being pivotally connected to movable bearer (2) by a branch pin (64), a torsion spring (65) being wound around the branch pin (64) externally, a constant distance being always maintained between arc end (631) of the braking rod (63) and the braking disk (62), a pulley (633) being tied to tail end (632) of the braking rod (63), a sinking line (66) being wound on said pulley (633) wherein one end being fixed on fix support (1) and other end being tied to a floating weight (67) contained in a guide cylinder (68), said guide cylinder (68) being fixed to the fix support (1).

Several floating bodies (7) are mounted at bottom of the movable bearer (2) in order to maintain said movable bearer floating on sea surface.

When the present invention is applied, square horn port (23) in front of the movable bearer (2) is faced to the coming direction of the sea wave, introducing the impulsion force of impacted sea wave to water channel (25), meanwhile, higher wave being introduced through square horn port (24) at the upper end to a water channel (26). Both streams of impulsion force are combined to push blade (30) and nose strip (301) of the water wheel (3) and rotate the round disk (32), also, it will activate an eccentric connecting rod (33), activating a piston rod end (42) of the pressure cylinder (4) within the guide channel (36), thus causing the upward displacement of the piston (41) of the pressure cylinder (4) and reducing the void, compressing air into a high pressure gas, entering and storing in a storage cylinder through manifold (452) and check valve (48) for use in a power or electricity generating device. When water wheel (3) of blade type is continuously rotated, piston (41) of the pressure cylinder (4) will move downwards, vacuum occured as a result of enlargement of void, and air will enter pressur cylinder (4) through air filter (47), check valve (46) and manifold (451). High pressure air will be continuously generated through compression by means of a impulsion force resulted from continuous rotation of piston (41) of the blade type water wheel (3). Under such a cyclic activation, pressure cylinder (5) will store high pressure air and maintain continuous operation of power or electricity device generated by high pressure air. If sea wave is decreased suddenly, arc end (631) of braking rod will be activated by floating weight (67), abrading the braking disk (62) and slowing the rotation of gear (61) to prevent a too fast drop of the movable bearer (2).

In summary, the present invention has the following advantages:

1. It utilizes a natural clean energy without deteriorating the quality of living environment of human being.

2. It will not be affected by water source and water level for maintaining operation to supply energy normally required for a power or electricity generating device.

3. Energy generated from the present invention can be used immediately or stored 4. Construction is simple. It can be installed very conveniently, storage capacity is very large. Also, it has a wide range of application.

I claim:

1. A power generating device using the impact forces of sea waves comprising:
   a fixed support having support rods, the bottoms of which are fixed to a shallow sea bed;
   a movable bearer slidably mounted on the fixed support with a square type horn port provided at the front end face and a protion of the upper face;
   a blade type water wheel located at an outlet connected to the square type horn port of said movable bearer;
   two pressure cylinders, used to generate high pressure air, operated by connecting rods eccentrically mounted to the blade type water wheel;
   a storage cylinder for storing high pressure air compressed by said pressure cylinders;
   braking means provided at each side of the movable bearer to slow any sudden movement of the entire movable bearer in a vertical direction;
   several floating bodies mounted at the bottom of the movable bearer; characterized in that:
   the fixed support has toothed strips mounted vertically at both sides, with dovetail strips connected to the rear of the toothed strips;
   the movable bearer has dovetail channel rods corresponding to and slidably matching the dovetail strips on the fixed support;
   the square type horn port has a water channel connected thereto for guiding sea water to the water wheel;
   the blade type water wheel has a shaft rotatably connected to the movable bearer by a bearing and a seat, a round disk attached to both ends of the shaft, the disks having a pin eccentrically inserted at an external portion thereof, said pin being pivotally connected to one end of a connecting rod, the other end of the connecting rod being pivotally connected to a piston rod of the pressure cylinder;
   each braking means consists of a gear engaging the toothed strip on the fixed support, a braking disk attached to the gear, and a braking rod, one end of the rod being adjacent to the braking disc for applying a retarding force, the other end being connected to and movable by a line attached to a weight in a guide cylinder;
   the floating bodies mounted at the bottom of the movable bearer maintain the bearer on the water surface enabling the horn port to accept the impact of the sea waves thus turning the water wheel and operating the pressure cylinders to generate high pressure air to be used in a power or electric generating device.

2. A sea wave impacted power generating device as in claim 1 wherein the ports at the front face and the upper face each have a water channel arranged parallelly at different heights.

3. A sea wave impacted power generating device as in claim 1 wherein the braking rod is directly beneath the braking disk and is pivotally mounted on a branch pin fixed on the movable bearer, said branch pin having a torsion spring associated therewith so as to maintain a constant distance between the braking rod and the braking disk until a sudden movement of the movable bearer in a vertical direction activates the braking rod, by means of gravity acting on the weight, enabling the braking rod to contact the braking disk and slow the movement of the gear on the toothed strip.

* * * * *